Patented June 29, 1954

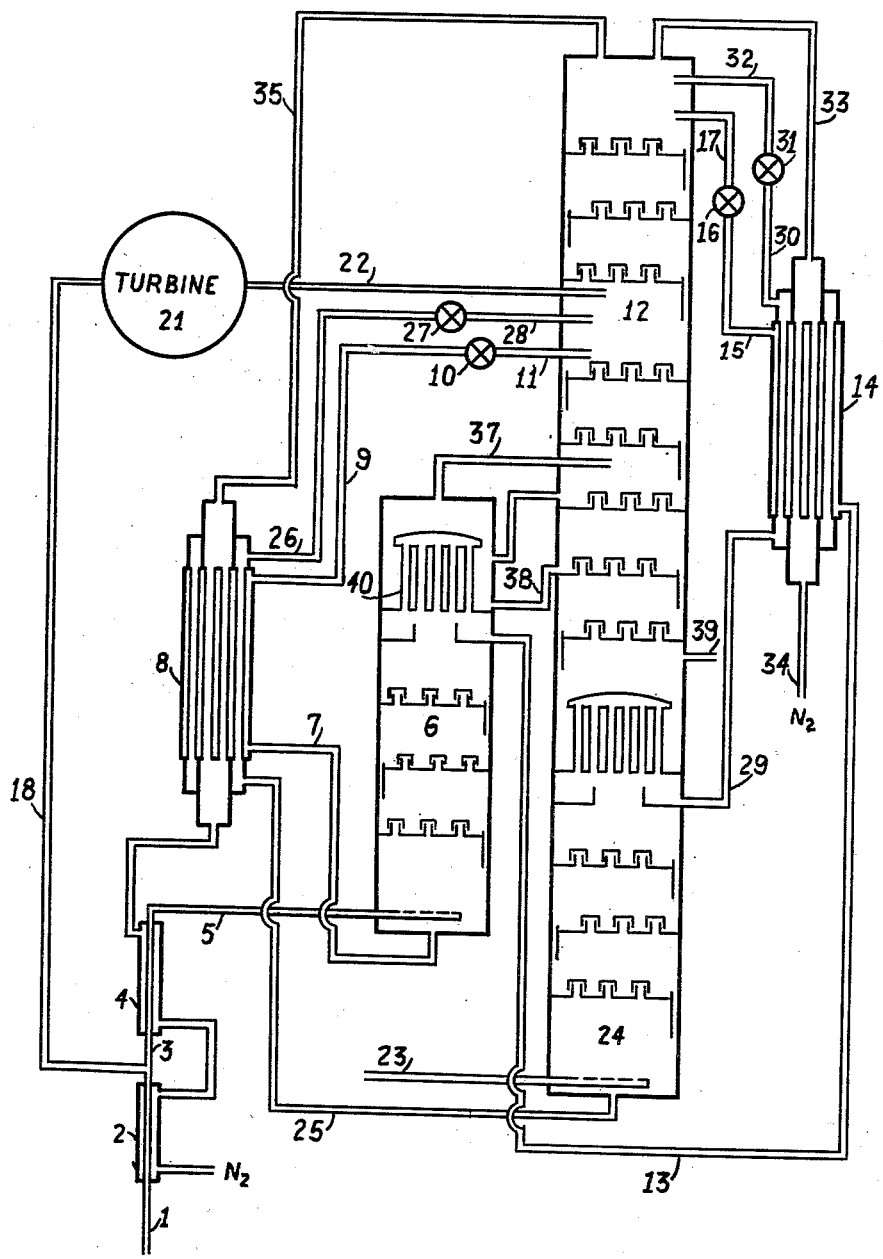

2,682,162

UNITED STATES PATENT OFFICE 2,682,162

SEPARATION OF GASES INTO TWO COMPONENTS BY DISTILLATION

Julian Langer, New York, N. Y.

Application February 17, 1951, Serial No. 211,461

4 Claims. (Cl. 62—175.5)

This invention relates principally to the separation of air into its principal constituents.

The liquefaction and subsequent separation of air by distillation has been practiced for years. The common type of distillation column used is the double column. It is the object of the present invention to improve upon present double column arrangements for the separation of air or similar gaseous mixtures so that power consumption will be lowered.

For the attainment of these and other such objects as may appear or be pointed out, I have shown an embodiment of my invention in the accompanying drawing.

At present, only one reboiler-condenser per double column is in common practice. This arrangement necessitates the evaporation of only comparatively pure liquid oxygen. Since comparatively pure nitrogen is condensed in the lower reboiler-condenser, the pressure within the lower column must be sufficiently high so that the nitrogen is condensed by the evaporation of this comparatively pure liquid oxygen in the upper column.

One will find that it isn't essential to evaporate all the liquid only when it is comparatively pure liquid oxygen at the bottom of the upper column in order that the double column will operate. It is possible to evaporate some of the liquid in the lower part of the upper column while said liquid still contains appreciable quantities of nitrogen and allow only the remainder of the liquid to reach the bottom of the upper column and evaporate there.

Liquid mixtures of oxygen and nitrogen are more volatile than essentially pure liquid oxygen, thus, said mixtures will boil at lower temperatures than liquid oxygen will under the same pressure. Thus, if additional lower columns are used, the condensation in these additional lower columns can be achieved by using intermediate reboiler-condensers within or adjacent to the lower part of the upper column. It is apparent that the pressure within these additional lower columns can be lower than that required in the single lower column that is ordinarily used.

Since some of the air need be compressed only to the pressure required for the operation of these additional lower columns, a reduction in power consumption will result.

The reboiler-condensers of these additional lower columns shall be located at a level within or adjacent to the upper column according to the pressure within these additional lower columns, the higher the pressure within these lower columns, the lower shall the position of the corresponding reboiler-condenser be in respect to the other reboiler-condensers of the other lower columns.

The procedure will be readily understood by reference to the drawing. A preferred method is as follows. Some air is compressed to approximately five atmospheres, cooled in a suitable heat exchanger by some of the cold exit products and enters at the bottom of the lowest lower column 24 via pipe 23. In this lower column 24, this air is separated in the ordinary manner into relatively pure liquid nitrogen which leaves through pipe 29, is subcooled in heat exchanger 14, leaves heat exchanger 14 via pipe 30, is throttled by valve 31 and enters the top of the upper column via pipe 32. The liquid enriched air leaves via pipe 25, is subcooled in heat exchanger 8, leaves heat exchanger 8 via pipe 26, is throttled by valve 27 and enters the upper column via pipe 28.

Some air compressed to approximately two and a half atmospheres enters heat exchanger 2 through pipe 1. Here, some of it goes through pipe 18, valve 19, pipe 20, through the turbine 21, and pipe 22 into the upper column. This quantity of air will vary with the initial pressure and the amount of refrigeration required. The temperature of the air entering the turbine is such that the turbine exhaust is approximately at its saturation temperature.

The remainder of the air leaving heat exchanger 2, enters heat exchanger 4 via pipe 5 and enters the bottom of the additional lower column 6 at approximately its saturation temperature. In the additional lower column 6 the air is separated in the usual fashion into a comparatively pure liquid nitrogen and a liquid enriched air. The comparatively pure liquid nitrogen leaves via pipe 13, is subcooled by heat exchanger 14, leaves heat exchanger 14 via pipe 15, is throttled by valve 16 and enters the top of the upper column via pipe 17. The enriched liquid air is removed via pipe 7, is subcooled in heat exchanger 8, leaves heat exchanger 8 via pipe 9, is throttled by valve 10, and enters the upper column via pipe 11.

Operations within the upper column 12 are entirely normal except that at a level below the feed points the liquid falling from plate to plate in the upper column is diverted to the reboiler-condenser 40 of the additional lower column 6. Some of the liquid evaporates, causing condensation of nitrogen in the lower column. The resulting vapors reenter the upper column via pipe 37. The remaining liquid reenters the upper column via pipe 38.

The exit gaseous oxygen product leaves through pipe 39 whence it will cool some of the incoming air in suitable heat exchangers. Gaseous nitrogen product exits via pipes 33 and 35. It serves as the cooling fluid in heat exchangers 8, 4, 2, and 14 as well as other heat exchangers which cool some of the incoming air. Although only one additional lower column is shown in the illustration, several may be employed. Other arrangements, such as adding to the stream of air which exhausts from turbine 21 is possible. Also, expansion of another stream of compressed air is possible in order to provide refrigeration.

I claim:

1. A process for the separation of air into two components, consisting of a preliminary rectification of two streams of pure and essentially saturated air wherein the second stream is at a higher pressure than the first, and each stream is rectified in its individual lower column into a liquid nitrogen portion and an enriched liquid air portion, subcooling the resulting streams of enriched liquid air and liquid nitrogen by sensible heat exchange with the final nitrogen product, throttling the various subcooled streams into their appropriate levels in the main or upper column, diverting the reflux in the upper column at an appropriate level to the reboiler-condenser of the lower column which operates under the lowest pressure and causes the necessary condensation within this lower column by partial, open evaporation, returning the resulting vapor and remaining liquid to their appropriate levels in the upper column, securing the evaporation at the bottom of the main column by latent heat exchange with the condensing nitrogen in the reboiler-condenser of the lower column operating under the higher pressure.

2. A process for the separation of air into two components, consisting of a preliminary rectification of several streams of pure and essentially saturated air wherein each stream is under successively higher pressure and each stream is rectified in its individual lower column into a liquid nitrogen and an enriched liquid air portion, subcooling the resulting streams of enriched liquid air and liquid nitrogen by sensible heat exchange with the final nitrogen product, throttling the various subcooled streams into their appropriate levels in the main or upper column, diverting the reflux in the upper column at an appropriate level to the reboiler-condenser of the lower column which operates under the lowest pressure and causes the necessary condensation within this lower column by partial, open evaporation, returning the resulting vapor and remaining liquid to the main column, diverting the reflux at a lower level in the main column to the reboiler-condenser of the lower column which operates under the next higher pressure where it causes the necessary condensation within this lower column by partial, open evaporation, returning the resulting vapor and remaining liquid to the main tower, and in like manner secure the necessary condensation within all the lower columns, the lower column under the highest pressure being the last, and utilizes the reflux at the bottom of the main column.

3. A process for the separation of a gaseous mixture into two components, consisting of a preliminary rectification of two saturated streams of this mixture, wherein the second stream is under a higher pressure than the first, and each stream is rectified in its individual lower column into a liquid portion consisting of the more volatile component and an enriched less volatile liquid portion, subcooling the resulting streams of less volatile and more volatile liquid fractions by sensible heat exchange with the more volatile final product, throttling the various subcooled streams into their appropriate levels in the main or upper column, diverting the reflux in the upper column at an appropriate level to the reboiler-condenser of the lower column which operates under the lower pressure and causes the necessary condensation within this lower column by partial, open evaporation, returning the resulting vapors and remaining liquid to their appropriate levels in the upper column, securing the evaporation at the bottom of the main column by latent heat exchange with the condensing nitrogen in the reboiler-condenser of the lower column operating under the higher pressure.

4. A process for the separation of a gaseous mixture into two components, consisting of a preliminary rectification of several saturated streams of this mixture wherein each stream is under successively higher pressure and each stream is rectified in its individual lower column into a liquid portion consisting of the more volatile component and an enriched less volatile liquid portion, subcooling the resulting streams of less volatile and more volatile liquid fractions by sensible heat exchange with the more volatile final product, throttling the various subcooled streams into their appropriate levels in the main or upper column, diverting the reflux in the upper column at an appropriate level to the reboiler-condenser of the lower column which operates under the lowest pressure and secures the necessary condensation within this lower column by partial, open evaporation, returning the resulting vapor and remaining liquid to the main column, diverting the reflux at a lower level in the main column to the reboiler-condenser of the lower column which operates under the next higher pressure where it causes the necessary condensation within this column by partial, open evaporation, returning the resulting vapor and remaining liquid to the main tower, and in like manner secure the necessary condensation within all the lower columns, the lower column under the highest pressure being the last, and utilizes the reflux at the bottom of the main tower.

References Cited in the file of this patent

UNITED STATES PATENTS

| Number | Name | Date |
|---|---|---|
| 1,619,909 | Wilkinson | Mar. 8, 1927 |
| 2,316,056 | De Baufre | Apr. 6, 1943 |
| 2,386,297 | Dennis | Oct. 9, 1945 |
| 2,513,306 | Garbo | July 4, 1950 |
| 2,579,498 | Jenny | Dec. 25, 1951 |